Figure 4:
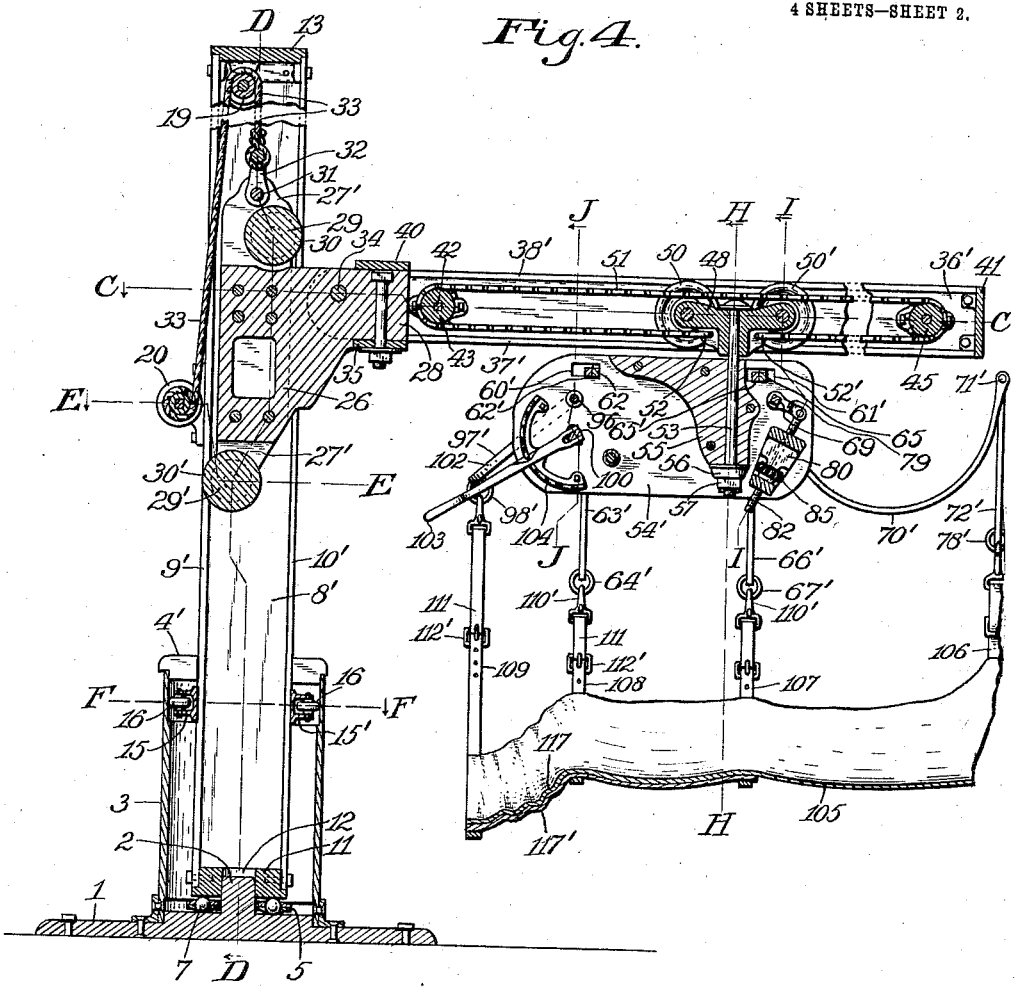

W. W. & J. F. MILLER.
APPLIANCE FOR HANDLING HELPLESS PERSONS.
APPLICATION FILED MAY 11, 1911.
1,018,723.
Patented Feb. 27, 1912.
4 SHEETS—SHEET 1.
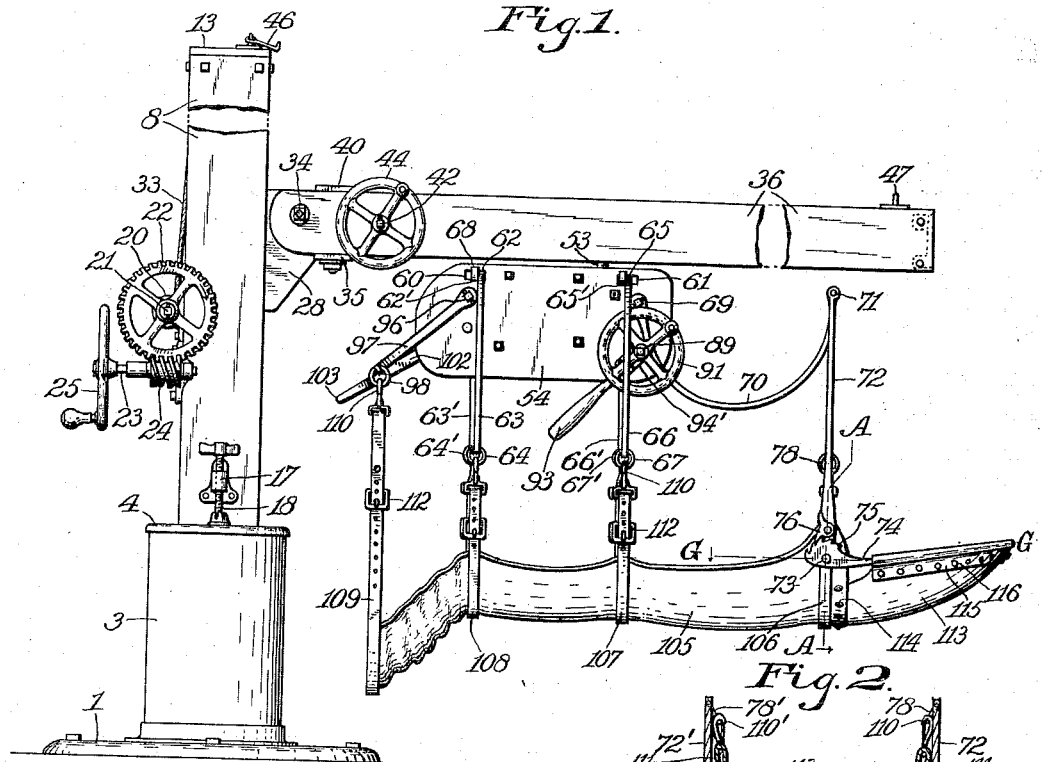
WITNESSES:
J. H. Gardner
G. W. Poyner
INVENTORS:
William W. Miller,
John F. Miller,
By E. T. Silvius,
ATTORNEY.

W. W. & J. F. MILLER.
APPLIANCE FOR HANDLING HELPLESS PERSONS.
APPLICATION FILED MAY 11, 1911.

1,018,723.

Patented Feb. 27, 1912.

4 SHEETS—SHEET 2.

WITNESSES:
J. H. Gardner
G. W. Poyner

INVENTORS
William W. Miller,
John F. Miller,
By E. T. Silvius,
ATTORNEY.

W. W. & J. F. MILLER.
APPLIANCE FOR HANDLING HELPLESS PERSONS.
APPLICATION FILED MAY 11, 1911.

1,018,723.

Patented Feb. 27, 1912.

4 SHEETS—SHEET 3.

WITNESSES:
J. H. Gardner
G. W. Poyner

INVENTORS:
William W. Miller,
John F. Miller,
By E. T. Silvius,
ATTORNEY.

W. W. & J. F. MILLER.
APPLIANCE FOR HANDLING HELPLESS PERSONS.
APPLICATION FILED MAY 11, 1911.

1,018,723.

Patented Feb. 27, 1912.

4 SHEETS—SHEET 4.

WITNESSES:
J. H. Gardner.
G. W. Poyner.

INVENTORS:
William W. Miller,
John F. Miller,
By E. F. Silvius,
ATTORNEY.

UNITED STATES PATENT OFFICE.

WILLIAM W. MILLER, OF UNION TOWNSHIP, AND JOHN F. MILLER, OF JACKSON TOWNSHIP, MIAMI COUNTY, INDIANA.

APPLIANCE FOR HANDLING HELPLESS PERSONS.

1,018,723. Specification of Letters Patent. Patented Feb. 27, 1912.

Application filed May 11, 1911. Serial No. 626,601.

*To all whom it may concern:*

Be it known that we, WILLIAM W. MILLER and JOHN F. MILLER, citizens of the United States, residing in Union township and Jackson township, respectively, in the county of Miami and State of Indiana, have invented a new and useful Appliance for Handling Helpless Persons, of which the following is a specification, reference being had to the accompanying drawings and to the letters and figures of reference marked thereon.

This invention relates to an appliance which is suitable for use in hospitals, sanatoriums or in dwellings, and it is designed to be used for conveniently handling helpless patients when it is required to lift them into or out of bed, or to move a patient into or out of a chair; the invention having reference more particularly to the means for directly supporting the patient, and adjusting means therefor.

The objects of the invention are to provide improved means, for handling helpless persons, that will be adapted to be operated and controlled by the least possible number of attendants, particularly where for various reasons one nurse alone may be in attendance.

Another object of the invention is to provide an appliance of the above-mentioned character that may be constructed at relatively small cost and be adapted to be moved from place to place as occasion may require, and which shall be so constructed as to permit the patient if able to use his hands to adjust or readjust the supporting means to suit his requirements or convenience.

A still further object is to provide an appliance or apparatus specially adapted for handling helpless persons, which shall be adapted also to be used temporarily as a cot in which the person may be easily turned about to different positions.

With the above-mentioned and minor objects in view, the invention consists in an appliance comprising a pillar provided with a suitable supporting base and having a folding arm mounted movably thereon, a carriage mounted movably on the arm, a hammock or suspended cot supported by the carriage, novel means for adjusting the hammock or cot relative to the carriage, and means for moving and controlling the arm.

Figure 5:
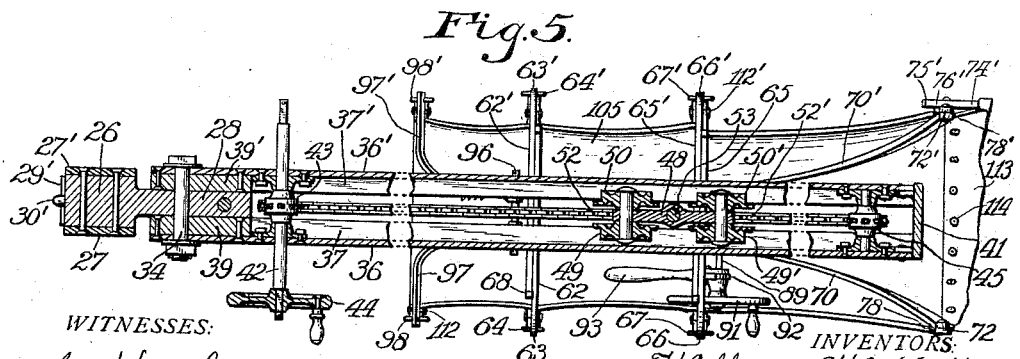
Figure 6:
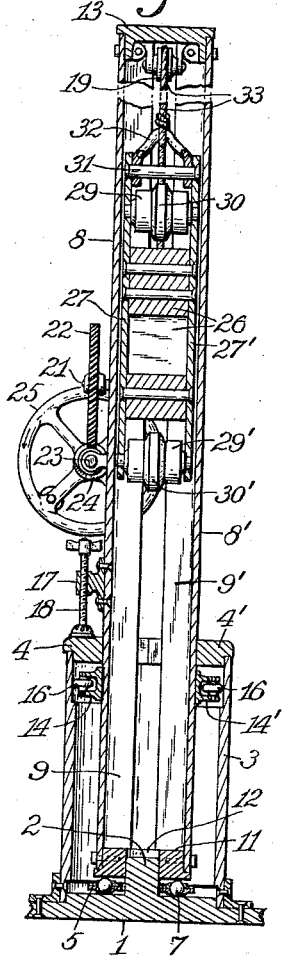
Figure 7:
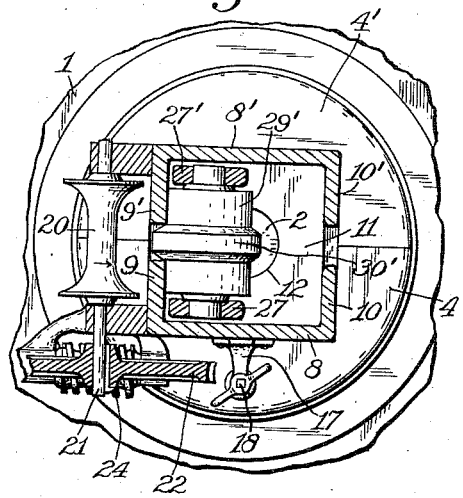
Figure 8:
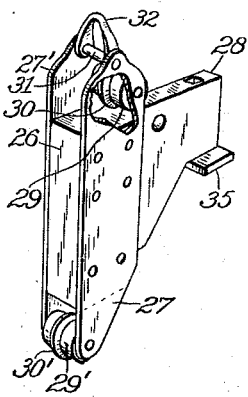
Figure 10:
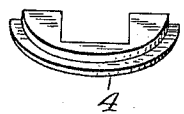
Figure 9:
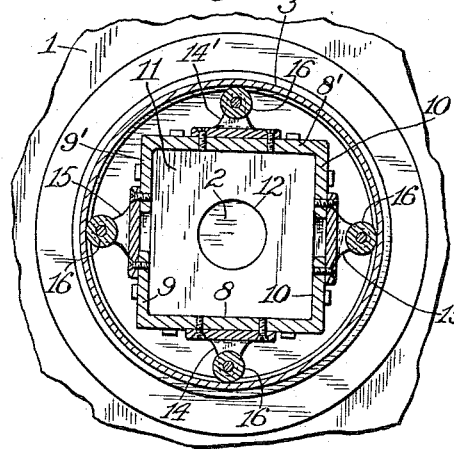
Figure 11:
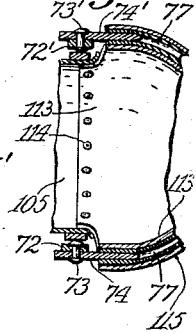
Figure 12:
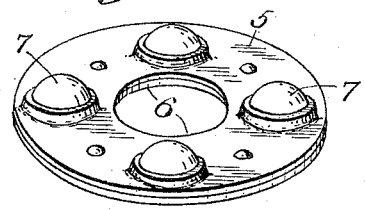
Figure 13:
Figure 14:
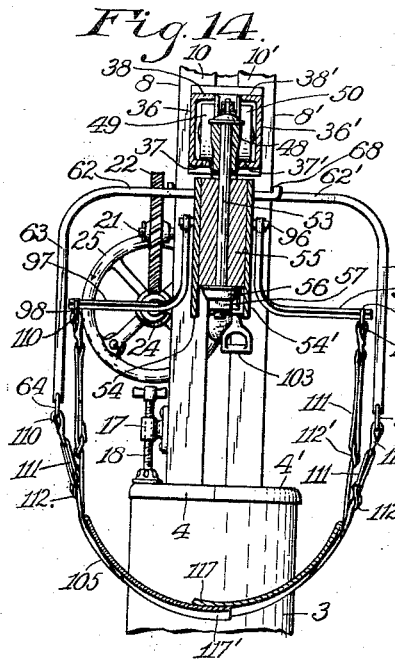
Figure 15:
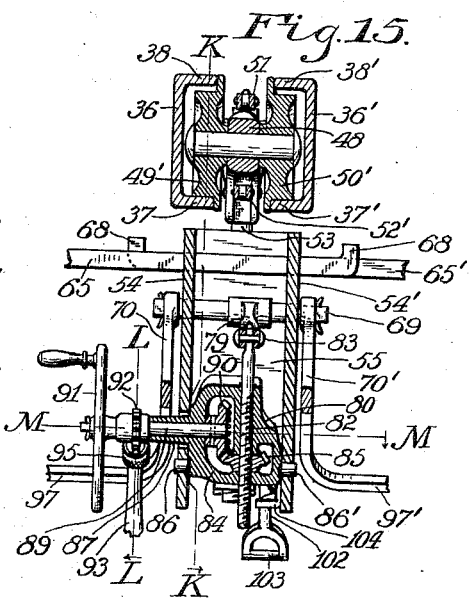
Figure 16:
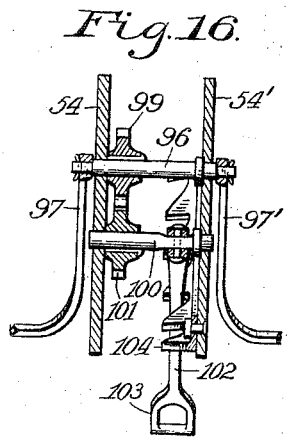
Figure 17:
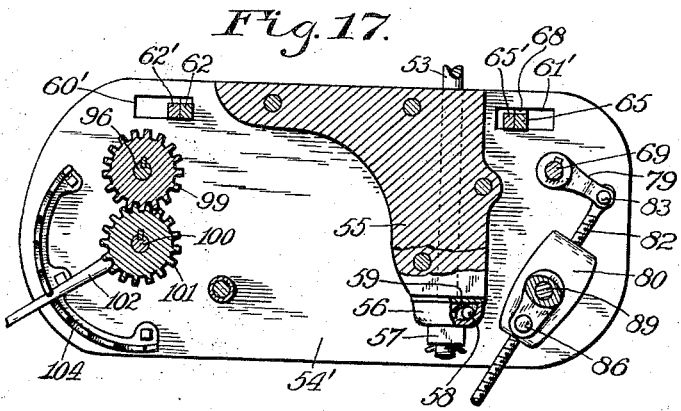
Figure 18:
Figure 19:
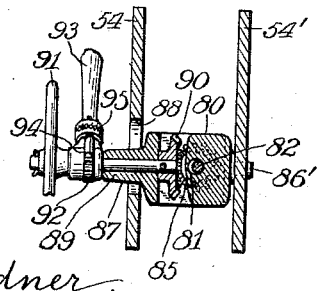
Figure 20:
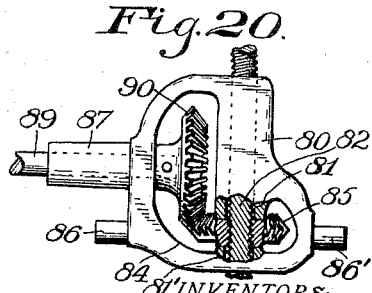

Referring to the drawings, Figure 1 is a side elevation of the appliance, the upper portion of the pillar being broken away; Fig. 2, a fragmentary section on the line A A in Fig. 1; Fig. 3, a top plan of the appliance; Fig. 4, a vertical section on the plane of the line B B in Fig. 3; Fig. 5, a fragmentary section on the line C C in Fig. 4; Fig. 6, a section on the line D D in Fig. 4; Fig. 7, a fragmentary section on the line E E in Fig. 4; Fig. 8, a perspective view of the head of the arm; Fig. 9, a fragmentary section on the line F F in Fig. 4; Fig. 10, a perspective view of one of the parts of the pillar; Fig. 11, a fragmentary section on the line G G in Fig. 1; Fig. 12, a perspective view of a ball-bearing of the pillar; Fig. 13, a central section of the ball-bearing; Fig. 14, a fragmentary section on the line H H in Fig. 4; Fig. 15, a fragmentary section on the line I I in Fig. 4; Fig. 16, a fragmentary section on the line J J in Fig. 4; Fig. 17, a sectional view of a part of the carriage and gearing therein on the line K K in Fig. 15; Fig. 18, a fragmentary section on the line L L in Fig. 15; Fig. 19, a fragmentary section on the line M M in Fig. 15; and Fig. 20, an elevation of parts of the adjusting gearing comprised in the carriage.

Similar reference characters in the different figures of the drawings indicate corresponding elements or features of construction herein referred to and described.

As preferably constructed a base 1 is provided which may be variously shaped in detail and is adapted to be supported securely on a floor or on a truck if desired, the top of the base being provided with an axial projection or center-pin 2 and a hollow cylinder 3 extending concentrically about the projection, the cylinder having a removable apertured top thereon comprising two parts 4 and 4', the top being adapted to turn upon the upper end of the cylinder. Preferably an annular ball-case 5 is provided, the aperture 6 therein being of the same diameter as the center-pin 2, the ball-case being adapted to retain and guide a suitable number of bearing-balls 7 which rest upon the base 1 so as to roll in a circle about the center-pin. The shaft of the pillar preferably is composed of two counter-part bars of channel-iron arranged uprightly at a suitable distance apart so as to provide two strong side plates 8 and 8′ arranged in parallel order, the flanges of the bars extending inwardly or toward one another with suitable space between the flanges of the two bars, said flanges constituting a pair of vertical guide-bars 9 and 9′ and a similar pair of guide-bars 10 and 10′. A foot-plate 11 is secured to the lower ends of the bars of which the pillar is composed and it has a central guide-opening 12 therein into which the center-pin 2 extends, the foot-plate resting upon the balls 7. A cap 13 is secured to the upper end portions of the bars and it with the foot-plate holds the bars at the required distance apart. Suitable means is provided for guiding the shaft in the upper portion of the cylinder 3 and preferably comprise a bracket 14 secured to the plate 8, a bracket 14′ secured to the plate 8′, a bracket 15 secured to the guide-bars 9 and 9′, and a bracket 15′ secured to the guide-bars 10 and 10′, each bracket having a roller 16 rotatably mounted therein and having contact with the inner side of the upper portion of the cylinder. A bracket 17 is secured to the exterior of the plate 8 and has a screw 18 therein arranged vertically so that the lower end of the screw may be moved tightly against the top of the cylinder for temporarily preventing rotation of the shaft. A sheave 19 is rotatably mounted in the upper portion of the shaft opposite the openings between the guide-bars 9 and 9′. A winding spool or drum 20 is mounted on the exterior of the guide-bars 9 and 9′ at a suitable height above the base 1 and it has a projecting shaft 21 to which a gear-wheel 22 is secured, the shaft being parallel to the guide-bars. An operating shaft 23 is rotatably mounted on the guide-bar 9 so that its axis lies parallel to the plane of the plate 8 and it has a worm 24 thereon which is in contact with the wheel 22, an operating-wheel 25 being secured to the shaft 23.

An arm-head is provided which preferably comprises a center-block 26 and two side plates 27 and 27′ secured to the center-block and extending above and below it to constitute upper and lower ears, all adapted to be moved up or down in the hollow shaft of the pillar, the center-block 26 having a projection 28 thereon extending between the guide-bars 10 and 10′ and a suitable distance beyond. A roller 29 is rotatably mounted between the upper portions of the plates 27 and 27′ and it has a flange-like guide 30 thereon extending above its middle portion and fitting between the guide-bars 10 and 10′, the roller being in contact with the inner sides of the guide-bars. A similar roller 29′ is rotatably mounted between the lower end portions of the side plates and it is in contact with the guide-bars 9 and 9′, the roller having a guide 30′ thereon adapted to roll against the oppositely arranged edges of the guide-bars. The upper end portions of the side plates 27 and 27′ have a pivot 31 connected thereto to which a loop 32 is connected, a cable 33 being connected to the loop and extending over the sheave 19 and thence outwardly through a space between the guide-bars 9 and 9′ to the spool 20 to which it is connected, for raising or lowering the arm-head, the worm 24 preventing the spool from unwinding the cable with the weight of the arm-head supported thereby. The projection 28 is provided with a horizontal pivot 34 arranged relatively close to the guide-bars 10 and 10′, and the under side of the end portion of the projection has a stop plate 35 secured thereto and extending laterally beyond the sides of the projection. An arm preferably is composed of two counterpart channel-iron bars arranged with the flanges thereof turned inwardly or each toward the other with suitable space between them, so as to constitute two beams 36 and 36′ on the lower portions of which are two track rails 37 and 37′, and two guard rails 38 and 38′ on the upper portions of the beams, the beams having filling blocks 39 and 39′ secured to the inner sides of one end portion thereof that are in contact with opposite sides of the projection 28, said end portion of the arm composed of said beams being connected to the pivot 34 and in normal position resting upon the stop plate 35, the top of the arm having a stop plate 40 secured thereto which normally rests upon the top of the projection for supporting the arm in horizontal position. An end plate 41 is secured to the free end portions of the beams and holds them at the required distance apart. A controlling shaft 42 is rotatably mounted horizontally in the beams 36 and 36′ adjacent the projection 28 and it has a sprocket-wheel 43 secured thereto between the beams, the shaft projecting beyond both beams and having a hand-wheel 44 arranged removably on one end thereof, the opposite end of the shaft being adapted to have the wheel connected thereto so that the attendant may rotate the shaft at either side of the arm. A guide-wheel 45, which preferably is formed as a sprocket-wheel, is rotatably mounted in the outer end of the arm. The arm may be moved upward about its pivot so as to stand in upright position when not in use, and when upright may be conveniently held in such position by means of a hook 46 mounted on the cap 13 and adapted to engage an eye 47 mounted upon the outer end of the arm.

A suitable carriage preferably comprises a frame 48 provided with two flange-wheels 49 and 49′ supported on the rail 37 and two similar wheels 50 and 50′ supported on the rail 37′, the wheels being of suitable diameter so as to nearly touch the guard rails 38 and 38' to prevent the carriage from being tilted. A sprocket-chain 51 extends about the wheels 43 and 45 and above the frame of the carriage, the end portions 52 and 52' of the chain being connected to the under side of the frame 48 so that the carriage may be moved by means of the controlling shaft 42. The frame 48 supports a relatively long pivot rod 53 which extends downwardly and supports a gear-housing which preferably comprises two side plates 54 and 54' and a center-block 55 secured to the plates between them, the rod 53 extending through the center-block and having a ball cup 56 thereon supported by a nut 57 on the lower end portion of the pivot rod, there being bearing-balls 58 in the cup upon which a cone 59 is supported which directly supports the center-block 55. The housing is prevented from rocking or tilting by virtue of the relatively long bearing afforded in connection with the pivot rod 53 but may be freely turned about the rod and beneath the arm on which the carriage is mounted. The upper portions of the plates 54 and 54' have horizontally extending slots 60 and 60' in one end portion thereof and similar slots 61 and 61' in the opposite end portion thereof. Two horizontal bars 62 and 62' are arranged in the slots 60 and 60' and have downwardly extending arms 63 and 63' provided at their lower ends with rings 64 and 64', respectively. Similar horizontal bars 65 and 65' are arranged in the slots 61 and 61' and have downwardly extending arms 66 and 66' thereon provided at their lower ends with rings 67 and 67', respectively. The horizontal bars are prevented from being accidentally withdrawn from the slots preferably by means of a lug 68 turned upon the end of each bar, but the lug may pass through the slots when the bar is turned over on its side. It will be understood that the bars may be adjusted longitudinally in the slots relative to the housing so that the depending arms may be arranged at various distances apart.

Near the bars 65 and 65' a shaft 69 is arranged between the plates 54 and 54' and rotatably mounted therein and has a pair of arms 70 and 70' secured thereto at the outer sides of the plates, the arms being curved downwardly and thence outwardly and upwardly, the free ends of the arms being provided with pivots 71 and 71' to which links 72 and 72' are connected so as to normally hang on the pivots. The lower end portions of the links are provided with pivots 73 and 73' to which relatively short arms 74 and 74' are connected and provided on their upper sides with notched quadrants 75 and 75', respectively, the quadrants being normally engaged by dogs 76 and 76' mounted movably upon the links, the arrangement being such as to normally support the arms adjustably with more or less inclination to the horizontal. A curved hollow rail 77 is placed removably on the arms 74 and 74', the ends of the rail serving as sockets to receive the ends of the arms. The links 72 and 72' are provided with rings 78 and 78' which are arranged somewhat above the dogs that are on the links. In order to adjust and hold the arms 70 and 70' an arm 79 is secured to the shaft 69 between the plates 54 and 54'. A movable gear-frame 80 has a guide-opening 81 therein in the upper portion thereof and a similar guide-opening 81' in the lower portion thereof through which a screw 82 extends that is connected at its upper end to the arm 79 by means of a pivot 83, the frame 80 having an opening 84 therein in which a bevel gear-wheel 85 is mounted rotatably, the gear-wheel being screw-threaded and serving as a nut through which the screw 82 extends. The frame is provided with a pair of trunnions 86 and 86' which are mounted in the plates 54 and 54' the frame having also a journal-box 87 thereon which extends through a slot 88 in the plate 54 and rotatably supports a shaft 89 on the inner end of which a bevel gear-wheel 90 is secured, the wheel being arranged in the opening 84 and in contact with the wheel 85. The outer end portion of the shaft 89 has a hand-wheel 91 thereon adapted to be used by an attendant, and in order to enable the patient to easily adjust the arms 70 and 70' a ratchet-wheel 92 is secured to the shaft 89, an operating lever 93 being pivotally mounted also on the shaft and provided with a pair of dogs 94 and 94', either one of which may be moved yieldingly into engagement with the ratchet-wheel by means of a reversing sleeve 95, so that the shaft 89 may be forcibly rotated in either direction desired.

In order to enable the patient to raise or lower the foot end of the hammock or cot a shaft 96 is rotatably mounted in the housing plates 54 and 54', the shaft extending through the plates and having arms 97 and 97' thereon which extend downwardly and outwardly and are provided with rings 98 and 98' at their ends. The shaft has a gear-wheel 99 secured thereto between the housing plates. Another shaft 100 is rotatably mounted in the plates below the shaft 96 and it has a gear-wheel 101 secured thereto which is in contact with the wheel 99. An operating arm 102 is secured to the shaft 100 and has a handle 103 on its free end, the arm being adapted to be latched in engagement with a ratchet-toothed quadrant 104.

A suitable hammock or cot 105 is employed which may be suitably composed of canvas or other fabric and it is provided with transverse supporting straps or slings 106, 107, 108, 109, which extend beyond the edges thereof, each strap being connected to a pair of snap hooks 110 and 110', the end portions 111 of each strap being looped through the eye of the hook and provided with a buckle 112 or 112' which is adjustably connected to the strap so that the latter may be lengthened or shortened. By means of the snap hooks the strap 106 which is designed for supporting the shoulders of the patient is detachably connected to the rings 78 and 78'; the strap 107 for supporting the hips is connected to the rings 67 and 67'; the strap 108 for supporting the knees is connected to the rings 64 and 64' and the strap 109 for supporting the extremities of the limbs is connected to the rings 98 and 98'. A suitable head-rest 113 is connected to the hammock 105 near the strap 106 preferably by means of snap fasteners 114 so as to be detachable. The fabric of the head-rest is connected to the curved rail 77 and turned over it near its edge portion 115, the latter being connected to the body portion of the fabric preferably by means of snap fasteners 116 so as to be detachable. The hammock 105 is divided centrally from the position of the strap 107 to the strap 109, the adjacent edges 117 and 117' preferably overlapping and permitting the middle portion to be opened for convenience of the patient.

In practical use the patient is placed upon the hammock or cot in reclining position, the hammock in some cases being first disconnected from the carriage and placed on a bed along side of the patient who is then rolled over on the hammock, and then the arm is swung over the bed and adjusted vertically so as to permit the hammock to be connected to the carriage, which being done the nurse may operate the wheel 25 and raise the patient from the bed, after which the carriage may if desired be turned on the pivot 53 or may be moved along the arm, the shaft of the pillar being rotated as may be desired. A pillow may be placed on the head-rest 113 and the latter may be raised or lowered to afford comfort to the patient. Also the different supporting straps of the hammock may be independently adjusted as may be desired. In case the patient is extremely heavy or difficult to handle when it is desired to place him on the bed, the hammock may be lowered on to the bed and then the snap hooks supporting one side of the hammock may be disconnected from the supporting rings after which the carriage may be slightly elevated so as to lift the opposite side of the hammock and roll the patient therefrom onto the bed, or turn him sufficiently for comfort while remaining on the hammock. Other results of the operation of the different parts of the appliance will be readily understood from the description of the construction and functions thereof.

Having thus described the invention, what is claimed as new is—

1. An appliance including a supporting housing, a plurality of horizontal bars mounted in the housing and having downwardly extending arms, a plurality of arms pivotally mounted in opposite end portions of the housing, means mounted in the housing for holding or controlling movement of the pivotally mounted arms, and a hammock suspended to all the arms.

2. An appliance including a supporting housing, a shaft rotatably mounted horizontally in the housing and having two divergently extending arms fixed thereon, each arm being provided with a ring, means for controlling or fixedly holding the shaft, and a hammock mainly supported by the housing and having a supporting strap that is connected to the rings.

3. An appliance including a supported pillar, an arm guided vertically on the pillar, means mounted on the pillar for raising or lowering the arm, a carriage mounted movably on the arm and provided with a rotatable housing, a plurality of horizontal bars mounted in the housing and having downwardly extending arms thereon, and a hammock suspended to the arms.

4. An appliance including a supporting housing comprising two connected plates, each plate having a plurality of apertures therein, a plurality of horizontal bars arranged in pairs in the apertures, each bar being longitudinally adjustable in an aperture in each of the plates and having an angularly extending arm thereon, each arm being provided with a ring, and a hammock having straps detachably connected to the rings.

5. An appliance including an upright shaft, an arm mounted on the shaft, a carriage movably mounted on the arm and comprising a frame provided with a vertical pivot rod, a cup supported on the lower portion of the pivot rod, balls movable in the cup, a cone movable on the balls, a housing guided on the rod and seated on the cone, and a hammock supported by the housing.

6. An appliance including an upright shaft, an arm-head adjustable on the shaft, an arm pivotally mounted on the shaft and comprising two beams, each beam having a track rail on the under side thereof extending each toward the other, each beam having also a guard rail on the upper side thereof opposite the track rail, a carriage frame having two pairs of flanged wheels mounted on the track rails and extending in proximity to the guard rails, a housing carried by the carriage frame, and a hammock carried by the housing.

7. An appliance including a pillar base, a hollow slotted shaft mounted on the base, an arm-head movable vertically in the shaft and having a projection thereon extending through a slot that is in the shaft, the arm-head having a roller mounted on its upper portion that is guided against the inner side of the shaft, the arm-head having also a roller mounted on its lower portion that is guided against an opposite portion of the inner side of the shaft, an arm carried by the arm-head, a carriage mounted on the arm, and a hammock supported by the carriage.

8. An appliance including a supporting housing comprising two connected plates, a shaft rotatably mounted in one end portion of the two plates and having two curved and divergently extending arms fixed thereon adjacent the plates, a controlling arm secured to the shaft between the plates, means mounted in the housing for operating or holding the controlling arm, and a hammock mainly supported independently by the housing and having supporting connection with the two curved arms.

9. An appliance including a pillar, a hollow arm mounted on the pillar and having track rails, a shaft rotatably mounted in the arm adjacent the pillar and having a sprocket-wheel thereon, a hand-wheel on the shaft, a guide wheel rotatably mounted in the arm at the outer end thereof, a carriage frame having wheels mounted movably on the rails, a sprocket chain having two ends connected to the carriage frame and extending about the sprocket wheel and the guide wheel, a housing carried by the carriage frame, and a hammock carried by the housing.

10. An appliance including a supporting housing comprising two plates and a block secured to the two plates, two shafts rotatably mounted in the two plates and having each a gear wheel secured thereto that intermesh each with the other, a ratchet-toothed quadrant secured to the housing, an operating arm connected to one of the two shafts and engaging the quadrant, two arms secured to the other one of the two shafts and extending divergently each from the other, and a hammock mainly supported by the housing and having a supporting strap connected to the two divergently extending arms.

11. An appliance including a supporting housing, two arms pivotally mounted on the housing and extending divergently each from the other, means mounted in the housing for controlling the arms, two links pivotally connected to the two arms respectively and provided each with a ring, two relatively short arms pivoted to the two links respectively and having each a notched quadrant thereon, dogs movably mounted on the links in contact with the quadrants, a hammock mainly supported by the housing and having a supporting strap connected to the rings, and a head-rest connected to the hammock and partially supported by the relatively short arms.

12. An appliance including a hammock provided with a plurality of supporting straps, a plurality of hooks adjustably connected to different portions of the straps, there being two hooks connected to opposite end portions of each strap, a supporting housing provided with a plurality of supporting arms arranged in pairs and having each a ring thereon connected to a different one of the hooks, the arms of each of two of the pairs being adjustable each toward or from the other for adjustably supporting the middle portion of the hammock, the remaining arms being adjustable for independently raising or lowering opposite end portions of the hammock.

13. An appliance including a supporting housing, two arms pivotally mounted in the housing and extending divergently each from the other, means mounted in the housing for controlling the arms, two links connected to the two arms respectively and depending therefrom, a shaft rotatably mounted in the housing, means mounted in the housing for controlling the shaft, two arms secured to the shaft and extending divergently each from the other, and a hammock mainly supported by the housing and having two supporting straps thereon, one of the straps being connected to the two links, the other strap being connected to the two arms that are secured to the shaft.

14. An appliance including a supporting housing, a pivotal shaft rotatably mounted in the housing and provided with an operating arm, two supporting arms secured to the shaft and extending divergently each from the other, a gear frame mounted in the housing, an operating shaft rotatably mounted substantially in the housing, movable gearing connected with the operating shaft and the operating arm, a hammock mainly supported by the housing and having a supporting strap thereon connected substantially with the two supporting arms, a toothed wheel secured to the operating shaft, an operating lever guided on the operating shaft adjacent the toothed wheel, two dogs movably mounted on the lever, and a collar movable on the lever adapted to move either one of the dogs into engagement with the toothed wheel.

15. An appliance including a supporting housing comprising two connected plates, a shaft rotatably mounted in one end portion of the two plates and having an operating arm thereon between the plates, two divergently extending arms secured to the shaft, a gear frame pivotally mounted in the two plates, a screw-threaded gear-wheel rotatably guided in the gear frame, a screw extending movably in the gear frame and through the gear wheel and controlled by the latter, the screw being connected to the operating arm, an operating shaft rotatably mounted in the gear frame and having a hand-wheel thereon, a gear wheel secured to the operating shaft in contact with the screw-threaded gear wheel, and a hammock mainly supported by the housing and having supporting connection with the two divergently extending arms.

16. An appliance including a pillar base, a pillar shaft mounted vertically and rotatably on the base and supported laterally thereby, an arm-head guided vertically on the shaft of the pillar, a winding spool mounted on the shaft, a sheave mounted in the shaft, a cable connected with the spool and the arm-head and extending over the sheave, an arm pivoted to the arm-head and supported thereby, a carriage movably mounted on the arm and comprising a rotatable housing, a plurality of horizontal bars adjustably mounted on the housing and provided with downwardly extending arms, each arm being provided with a ring, a shaft mounted rotatably in one end portion of the housing and having curved arms thereon provided with pivoted links, each link being provided with a ring, a shaft rotatably mounted in the opposite end portion of the housing and having a gear-wheel and also two curved arms secured thereto, each of said last described arms being provided with a ring, means for controlling and operating said shafts that are mounted in the housing, and a hammock provided with suspending devices adjustably connected with said rings and provided also with an adjustable head-rest.

In testimony whereof, we affix our signatures in presence of two witnesses.

WILLIAM W. MILLER.
JOHN F. MILLER.

Witnesses:
CHARLES W. HUNT,
SAMUEL E. CABLE.

---

Copies of this patent may be obtained for five cents each, by addressing the "Commissioner of Patents, Washington, D. C."